United States Patent [19]
Minakuchi et al.

[11] Patent Number: 5,812,299
[45] Date of Patent: Sep. 22, 1998

[54] SCANNING OPTICAL DEVICE

[75] Inventors: Tadashi Minakuchi; Masahiro Oono; Mitsunori Iima; Hiroshi Kanazawa, all of Tokyo, Japan

[73] Assignee: Asahi Kogaku Kogyo Kabushiki Kaisha, Tokyo, Japan

[21] Appl. No.: 791,320

[22] Filed: Jan. 31, 1997

[30] Foreign Application Priority Data

| Jan. 31, 1996 | [JP] | Japan | 8-037266 |
| Feb. 2, 1996 | [JP] | Japan | 8-040606 |

[51] Int. Cl.$^6$ ............................................. G02B 26/08
[52] U.S. Cl. ................... 359/216; 359/204; 359/211; 347/243; 347/261
[58] Field of Search ................... 359/204–206, 359/209–211, 212, 216–219; 250/234–236; 347/233, 238, 248, 250, 258–261, 243

[56] References Cited

U.S. PATENT DOCUMENTS

| 4,600,837 | 7/1986 | DiStefano et al. | 250/235 |
| 5,204,523 | 4/1993 | Appel et al. | 250/236 |
| 5,208,456 | 5/1993 | Appel et al. | 250/236 |
| 5,212,381 | 5/1993 | Appel et al. | 250/236 |
| 5,498,869 | 3/1996 | Appel et al. | 359/216 |
| 5,521,739 | 5/1996 | Mirchandani | 359/216 |

FOREIGN PATENT DOCUMENTS

| 2198413 | 8/1990 | Japan . |
| 2240617 | 9/1990 | Japan . |
| 2140510 | 11/1990 | Japan . |

*Primary Examiner*—James Phan
*Attorney, Agent, or Firm*—Greenblum & Bernstein, P.L.C.

[57] ABSTRACT

A scanning optical device includes a light source, a polygon mirror having a plurality of reflecting surfaces for deflecting a light flux emitted from the light source to form a scanning beam spot on an image surface, an identifying device that identifies which reflecting surface is currently scanning the light flux, a memory that stores data corresponding to shape errors of the reflecting surfaces, a correcting member that corrects a position of the beam spot, and a controller that controls the correcting member in accordance with an output of the identifying device and with data read from the memory. The correcting member is controlled to compensate for deviations of the beam spot due to tilt errors of the reflecting surfaces and may also be controlled to compensate for deviations of the beam spot due to an unevenness of the movement of the image surface.

14 Claims, 5 Drawing Sheets

SCANNING OPTICAL DEVICE

BACKGROUND OF THE INVENTION

The present invention relates to a scanning optical device used for a laser beam printer or the like. In particular, the present invention relates to such a device that uses a polygon mirror as a deflector.

A scanning optical device includes a laser source, such as a semiconductor laser, a polygon mirror for deflecting a laser flux emitted from the laser source and an fθ lens that converges the laser flux onto an image surface such as a photoconductive drum to form scanning lines.

A plurality of reflecting surfaces of a metal polygon mirror are polished individually. Each of the plurality of reflecting surfaces may have individual tilting errors in which the reflecting surface is tilted with respect to a rotation axis of the polygon mirror.

The tilting error causes a distance between the scanning lines to vary. In a conventional scanning optical device, the tilting error is compensated by a combination of a cylindrical lens to form a linear image adjacent to the reflecting surface and an anamorphic fθ lens.

However, the slight variation of the distance between the scanning lines, which can not be corrected by the combination of the cylindrical lens and the anamorphic fθ lens, must be compensated in scanning optical devices that have a higher resolution.

SUMMARY OF THE INVENTION

It is therefore an object of the present invention to provide a scanning optical device that can compensate the influences due to shape errors, such as tilt errors of each individual reflecting surface of a polygon mirror.

According to an aspect of the present invention, there is provided a scanning optical device that includes a light source; a polygon mirror that includes a plurality of reflecting surfaces for deflecting a light flux emitted from the light source to form a scanning beam spot on an image surface; means for identifying which reflecting surface is currently scanning the light flux; and a memory for storing data corresponding to shape errors of the reflecting surfaces. In addition, a correcting member for correcting a position of the beam spot; and a controller controls the correcting member in accordance with the output of the identifying means and with data read from the memory.

In a particular case, the correcting member may correct the position of the beam spot in, for example, an auxiliary scanning direction.

In a further particular case, the correcting member may be controlled to compensate for deviations of the beam spot due to tilt errors of the reflecting surfaces. In this case, the memory stores data indicating a deviation of the beam spot from a reference position for each of the reflecting surfaces.

In yet a further particular case, the image surface may include a photoconductive drum and the correcting member may also compensate for deviations of the beam spot due to unevenness of the rotation of the photoconductive drum.

In this aspect of the scanning optical device, the identifying means may include an index signal generator that generates an index signal at least once per rotation of the polygonal mirror. In particular, the index signal generator may include an optical sensor for detecting a mark on the polygon mirror at an eccentric portion from the rotation axis of the polygon mirror.

In a particular case, the identifying means may further include a synchronization light sensor that generates a horizontal synchronization pulse for each main scan.

Also, in this aspect of the scanning optical device, the correcting member may include a dynamic prism that is disposed between the light source and the polygon mirror and a driving mechanism that rotates the dynamic prism to change the angle of the dynamic prism.

Further, the scanning optical device may also include a scanning lens for converging the light flux deflected by the polygon mirror.

Still further, the light source in the scanning optical device may include a plurality of light emitting elements that are independently actuated to form a plurality of scanning lines per scan.

According to another aspect, there is provided a scanning optical device that includes a light source; a polygon mirror for deflecting the light beam emitted from the light source; a scanning lens for converging the light bean deflected by the polygon mirror to form a beam spot on an image surface; an index signal generator for generating an index signal at least once per rotation of the polygon mirror; a memory for storing data of deviations of the beam spot in an auxiliary scanning direction due to tilting errors of reflecting surfaces of the polygon mirror; a dynamic prism that is rotatably disposed between the light source and the polygon mirror; a driving mechanism that rotates the dynamic prism to change the deviation angle of the dynamic prism; and a controller for controlling the driving mechanism in order to compensate for the deviation of the beam spot due to the tilting error for each individual reflecting surface, wherein the controller determines which reflecting surface is used to deflect the light flux based on the index signal and controls the driving mechanism in accordance with the data for the currently used reflecting surface read from the memory.

In a particular case, the image surface may include a photoconductive drum and the controller may also control the driving mechanism to compensate for deviations of the beam spot due to unevenness of the rotation of the photoconductive drum.

In a further particular case, the dynamic prism is disposed in an afocal optical path.

In yet a further particular case, the index signal generator may include an optical sensor for detecting a mark attached to the polygon mirror at a position eccentric from the rotation axis of the polygon mirror.

In yet a further particular case, the light source may include a plurality of light emitting elements that are independently actuated to form a plurality of scanning lines per scan.

DETAILED DESCRIPTION OF THE PREFERRED EMBODIMENTS

A scanning optical device according to the present embodiment is described with reference to FIGS. 1 through 5. The embodiment described is directed to a multi-beam scanning optical device that scans a plurality of laser fluxes across a predetermined angle producing eight scanning lines per scan on a surface, such as the surface of a photoconductive member.

Figure 1:
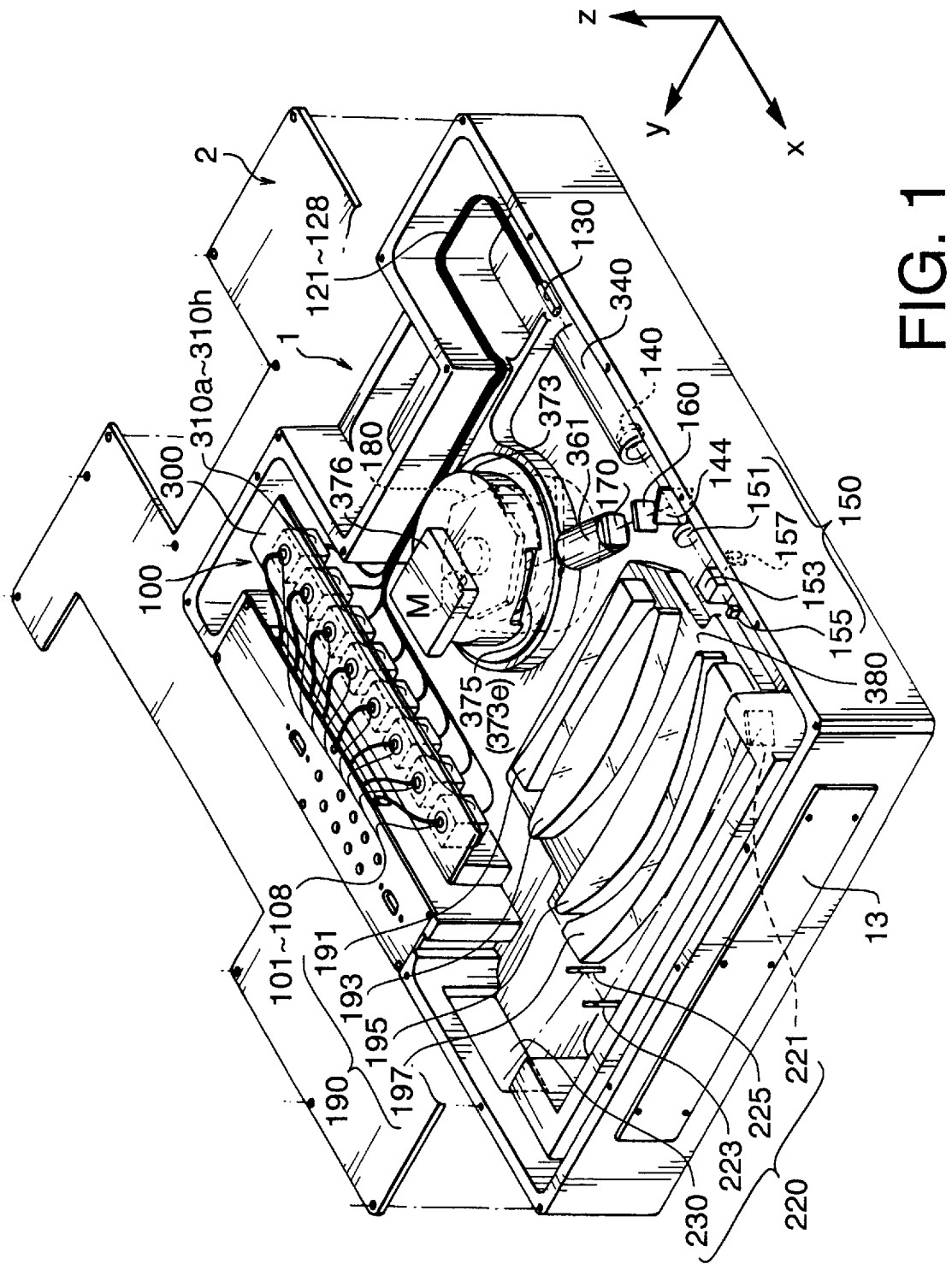
FIG. 1 is a perspective view showing a scanning optical device.
Figure 2:
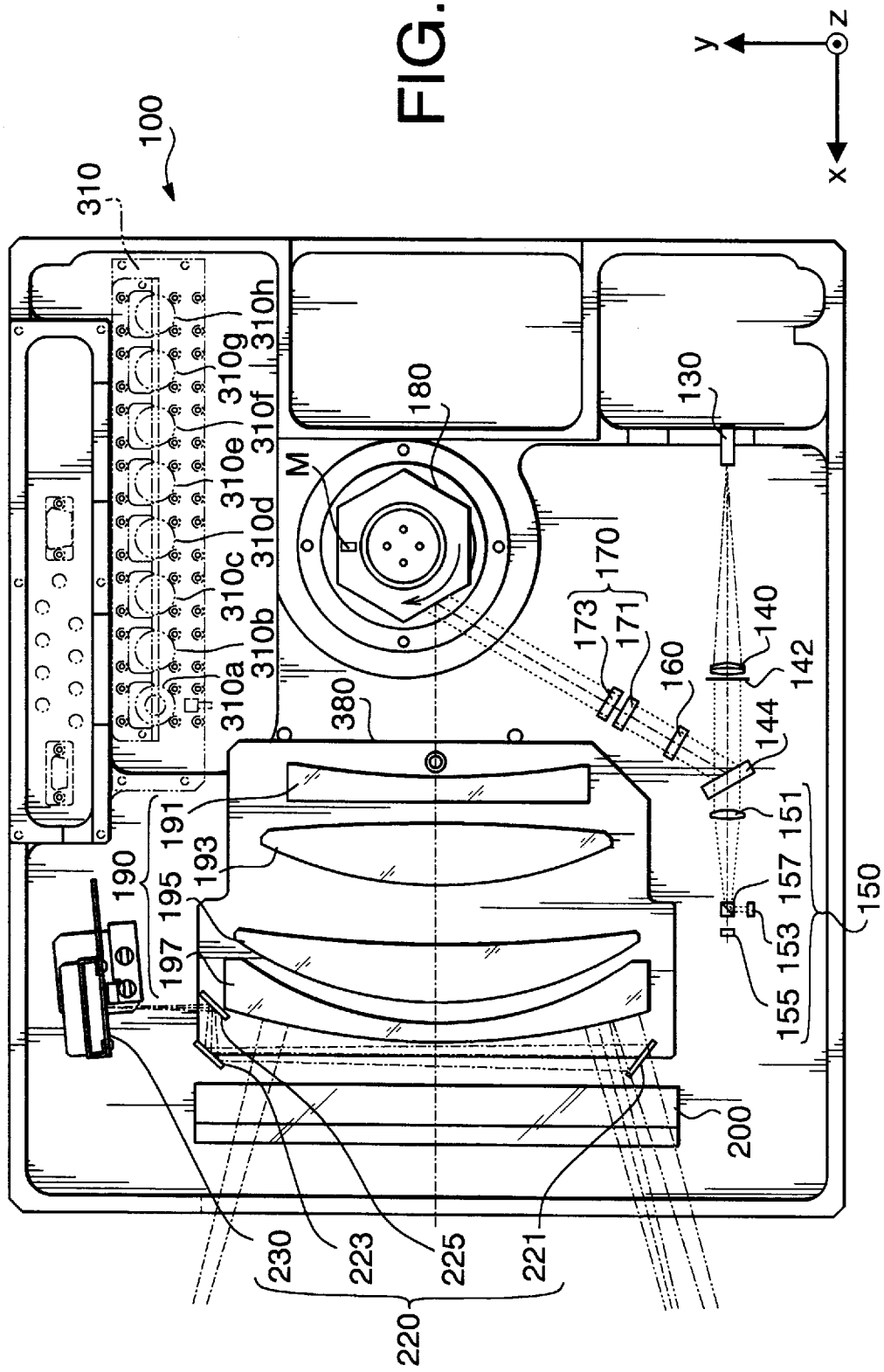
FIG. 2 is a plan view of the scanning optical device shown in FIG. 1 in a main scanning direction.

The structure of the scanning optical device is first described with reference to FIGS. 1 to 4. FIG. 1 shows a perspective view of the scanning optical device, FIG. 2 shows a plan view thereof, FIG. 3 shows a cross-sectional view thereof, and FIG. 4 shows an optical configuration of the scanning optical device.

Figure 3:
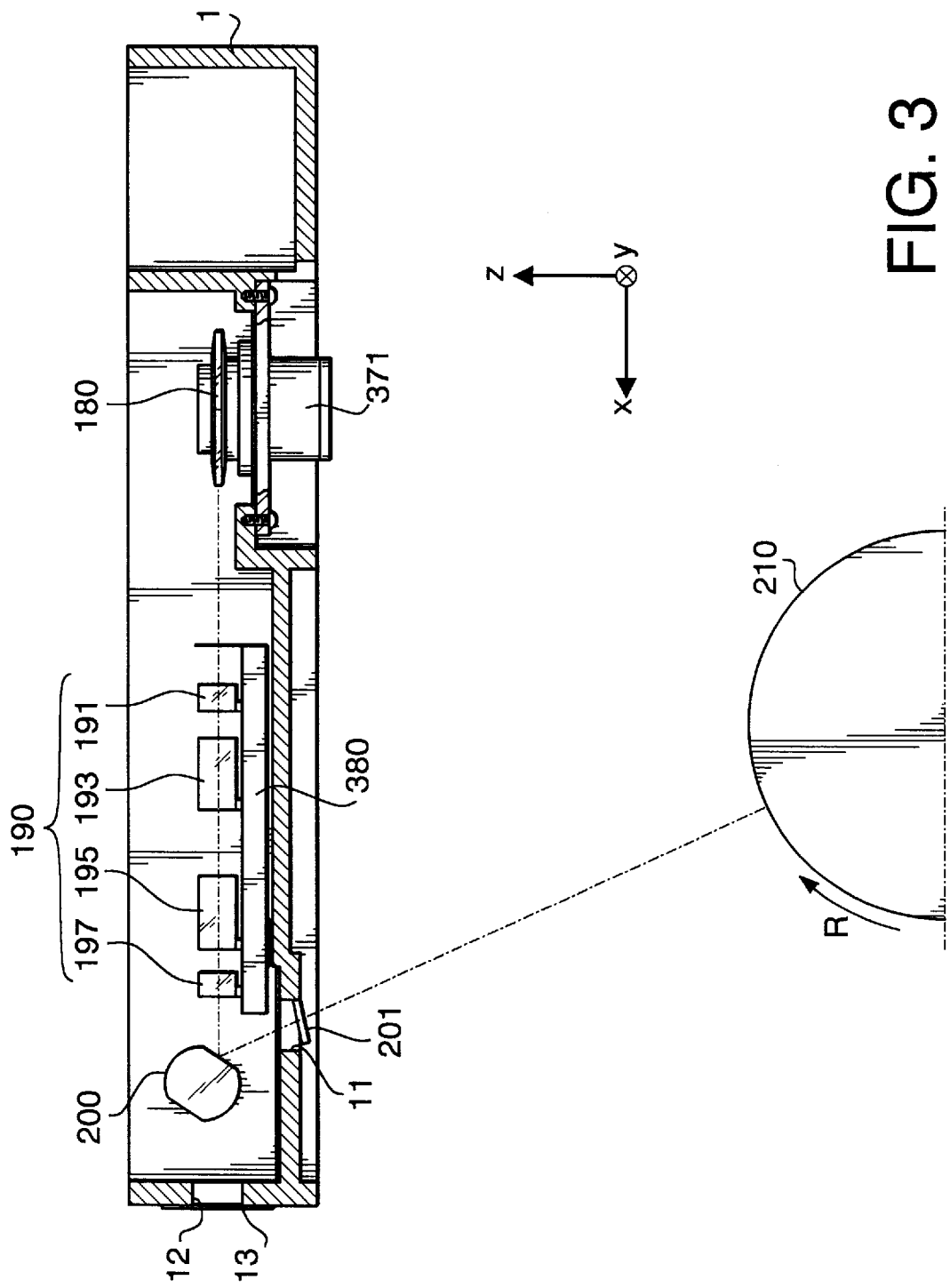
FIG. 3 is a cross-sectional view of the scanning optical device shown in FIG. 1 in an auxiliary scanning direction.
Figure 4:
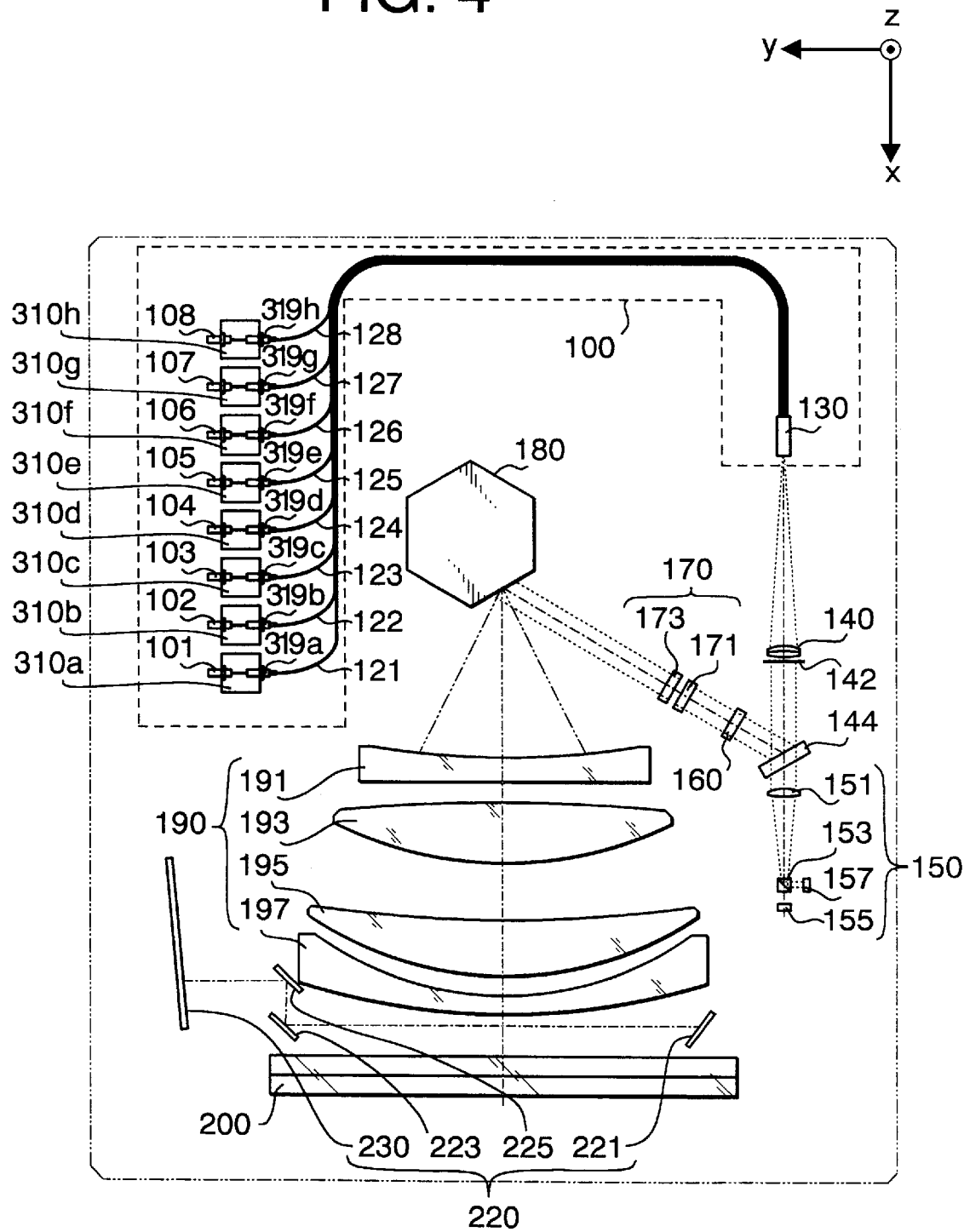
FIG. 4 shows an optical configuration of the scanning optical device of FIG. 1 in the main scanning direction.

As shown in FIGS. 3 and 4, the scanning optical device comprises a light transmission device 100, a polygon mirror 180, and an fθ lens 190 (scanning lens). In operation, eight laser fluxes are emitted from the light transmission device 100, deflected (scanned) by the polygon mirror 180, pass through the fθ lens 190, to form eight scanning lines on a photoconductive surface, such as a photoconductive drum 210.

Throughout this specification, a "main scanning direction" is defined as a direction in which a laser flux scans across the surface of a photoconductive member, and an "auxiliary scanning direction" is a direction in which the photoconductive member is translated or rotated to position the member for a subsequent main scan. The main scanning and auxiliary scanning directions are perpendicular to one another, and are both perpendicular to the optical axes of lenses guiding the laser fluxes. Since a laser flux typically is reflected or "folded" several times in the transmission from the light source to a photoconductive member, the main scanning and auxiliary scanning directions are not absolute, but are generally referred to with reference to the optical axis at a particular point along the optical path.

In this specification, an XYZ coordinate system is defined in each of FIGS. 1 through 4. The X axis is an axis parallel to the optical axis of the fθ lens 190, and the Y and Z axes are orthogonal to each other in the plane perpendicular to the X axis. The Y axis is parallel with the main scanning direction, and the Z axis is parallel with the auxiliary scanning direction.

As shown in FIG. 1, the scanning optical device further includes an open casing 1. In use, the top opening of the casing 1 is closed by an upper cover lid 2.

As shown in FIG. 4, the light transmission device 100 includes eight semiconductor lasers 101 through 108; eight laser blocks 310a through 310h (each attached to a supporting substrate 300), corresponding to each of the lasers 101 through 108; eight silica glass optical fibers 121 through 128, also corresponding to each of the lasers 101 through 108; and a fiber alignment block 130. Each of the lasers 101 through 108 is mounted in the corresponding laser block 310a through 310h such that the respective laser fluxes are guided to enter the corresponding optical fibers 121 through 128. Furthermore, the incident end portions of the optical fibers 121 through 128 are retained by fiber supporting members 319a through 319h fixed at the laser blocks 310a through 310h, respectively. The fiber alignment block 130 secures the exit end portions of the optical fibers 121 through 128 for aligning the eight optical fibers 121 through 128 such that eight point light sources are formed in a straight line.

A diverging light flux emitted from the fiber alignment block 130 is collimated by a collimator lens 140 held by a cylindrical collimator lens barrel 340, and is directed through an aperture 142. The aperture 142 defines a rectangular opening, longer in the main scanning direction, designed to regulate the beam shape (in the main scanning and auxiliary scanning directions) of the light flux emitted from the collimate lens 140.

The light flux that passes through the aperture 142 is directed to a beam splitter 144. The beam splitter 144 splits the light flux causing a part of the light flux to be transmitted as a monitor light flux and the remaining part to be reflected as a main light flux. The transmissivity of the beam splitter 144 (i.e., the amount of light transmitted as a monitor flux) is, for example, from 5 to 10 percent as a mean value of S polarized light and P polarized light.

The monitor light flux is directed into an automatic power control (APC) sensor system 150. The APC sensor system 150 includes a collective lens 151 for converging the monitor flux; a polarization beam splitter 153 which splits the light flux into two linear polarization components that are orthogonal to each other; a first APC light receiving element 155; and a second APC light receiving element 157.

The first and second APC light receiving elements 155 and 157 detect the light energy of the respective linear polarization components, and the output of the light receiving elements 155 and 157 is used for a feedback control of the output of the semiconductor lasers 101 through 108.

The main light flux reflected by the beam splitter 144 is transmitted through a dynamic prism 160. The dynamic prism 160 is rotatably disposed about an axis orthogonal to the optical axis to control the spot position in the auxiliary scanning direction on the image plane. That is, the dynamic prism 160 is preferably a wedge prism, supported to be rotatable about the main scanning direction in order to deviate the direction of the flux in the auxiliary scanning direction. The dynamic prism 160 corrects changes in the position of image spots (in the auxiliary scanning direction) on the scanning plane resulting from either or both of tilting error of the reflecting surfaces of the polygon mirror 180 and unevenness of rotation of a photoconductive drum 210 (shown in FIG. 3, and described later).

The main light flux transmitted through the dynamic prism 160 forms a linear image in the vicinity of the mirror surface of the polygonal mirror 180 by means of a cylindrical lens 170. The cylindrical lens 170 has positive power only in the auxiliary scanning direction. As shown in FIG. 1 and 2, the cylindrical lens 170 is supported by a cylindrical lens barrel 361 and is composed of two lenses 171, 173 having positive and negative power, respectively, in the auxiliary scanning direction.

As shown in FIG. 3, the polygonal mirror 180 is driven by a mirror motor 371 (fixed in the casing 1), and rotates clockwise from the viewpoint of FIG. 2 (shown by an arrow). Furthermore, as shown in FIG. 1, the polygonal mirror 180 is isolated from the atmosphere by a cup-like polygon cover 373 in order to prevent the generation of sound due to rotations, and to avoid damage to the mirror surface from collisions with dust or debris in the air.

An optical path opening 373e is formed at the side of the polygon cover 373, and a cover glass 375 is fitted in the optical path opening 373e. The main flux transmitted through the cylindrical lens 170 enters the polygon cover 373 through the cover glass 375, is deflected by the polygonal mirror 180, and is directed outward, passing again through the cover glass 375. Furthermore, a mark M is attached to or marked on the top surface of the polygonal mirror 180 and a sensor block 376 containing a sensor for detecting the mark M is provided on the top surface of the polygon cover 373.

A polygonal mirror may have facial errors (shape errors) on the reflection surfaces that are produced during manufacturing. This manufacturing error is often uneven between the respective reflection surfaces (i.e. between and among each side of the polygonal mirror). In order to compensate for these facial errors, the error quantity of each surface of the polygonal mirror 180 can be measured and stored in a memory (not shown) during the manufacture of the scanning optical device. Then, by distinguishing which reflection surface of the polygonal mirror 180 is currently being used for scanning, for example, according to the output of the sensor in the sensor block 376, at least the beam position and beam intensity may be corrected according to the error quantity inherent to each of the reflection surfaces of the polygonal mirror 180.

As shown in FIG. 3, the main flux reflected by the polygonal mirror 180 passes through the fθ lens 190 (an image forming optical system) and is reflected by a fold-over mirror 200 to the photoconductive drum 210, forming eight beam spots. The beam spots scan according to rotations of the polygonal mirror 180, forming eight scanning lines per scan on the photoconductive drum 210. The photoconductive drum 210 is driven and rotated in the direction of the arrow R in synchronization with the scanning of the beam spots, to form an electrostatic latent image on the photoconductive drum 210. The latent image is then transferred onto a sheet of paper (not shown) by a known electronic photography process.

The fθ lens 190 includes first, second, third and fourth lenses 191, 193, 195, 197 arranged in order from the polygonal mirror 180 side to the fold-over mirror 200 side, having negative, positive, positive and negative power in both the main scanning and auxiliary scanning directions, respectively. The first, second, third and fourth lenses 191, 193, 195, 197 are arranged on a lens base 380. The combination of first, second, third and fourth lenses 191, 193, 195, 197 in the fθ lens 190 operates such that the light flux that was linearly formed as an image in the auxiliary scanning direction at the polygonal mirror 180 is elliptically formed as an image on the photoconductive drum 210.

The first lens 191 of the fθ lens 190 is a negative lens having a concave spherical surface on the polygonal mirror 180 side, and a cylindrical surface having negative power only in the auxiliary scanning direction on the fold-over mirror 200 side. The surfaces of the lens are designed such that the first lens 191 has a comparatively large negative (i.e. more negative) power in the auxiliary scanning direction and a comparatively small negative power in the main scanning direction.

The second lens 193 of the fθ lens 190 is a meniscus-shaped toric lens having a convex-spherical surface on the polygonal mirror 480 side and a convex toric surface on the fold-over mirror 200 side. The surfaces of the lens are designed such that the second lens 193 has a comparatively large positive (i.e. more positive) power in the auxiliary scanning direction and a comparatively small positive power in the main scanning direction.

The third lens 195 is a positive meniscus lens having two spherical surfaces.

The fourth lens 197 is a negative meniscus lens having two spherical surfaces.

The main flux transmitted through the fθ lens 190 is detected by a synchronization sensor system 220 at each scan (i.e. for each surface of the polygonal mirror 180). The synchronization sensor system 220 is positioned in the optical path between the fourth lens 197 of the fθ lens 190 and the fold-over mirror 200. The synchronization sensor system 220 includes first, second, and third mirrors 221, 223, 225, and a synchronization light sensor 230 which receives the light fluxes reflected by the mirrors 221, 223, 225. The first mirror 221 is positioned in the optical path from the polygonal mirror 180 to the fold-over mirror 200 at one edge of the main scanning range, but outside of a predetermined image forming range (not shown). The second and third mirrors 223 and 225 are positioned outside of the optical path on an opposite side to the first mirror 221. The synchronization light sensor 230 is disposed at a position optically equivalent to the position on the surface of the photoconductive drum 210 at which scanning occurs. Thus, in each main scan, the eight fluxes are sequentially reflected by the first, second, and third mirrors 221, 223, 225 and strike the synchronization light sensor 230. A signal or signals output by the synchronization light sensor 230 are then used to synchronize the transfer of image data equivalent to one scan from a drive circuit (not shown) to drive the semiconductor lasers 101 through 108 according to the image data.

An image forming opening 11, which permits the main flux (including the eight individual fluxes) reflected by the fold-over mirror 200 to be transmitted to the photoconductive drum 210, is formed in the casing 1. A cover glass 201 is attached to the image forming opening 11.

An inspection opening 12 is formed behind the fold-over mirror 200. The inspection opening 12 is used when adjusting optical elements after the optical elements (excluding the fold-over mirror 200) are assembled. As shown in FIG. 3, the inspection opening 12 is covered by a cover plate 13 in normal use. The control of the dynamic prism 160 is now described with reference to FIG. 5.

Figure 5:
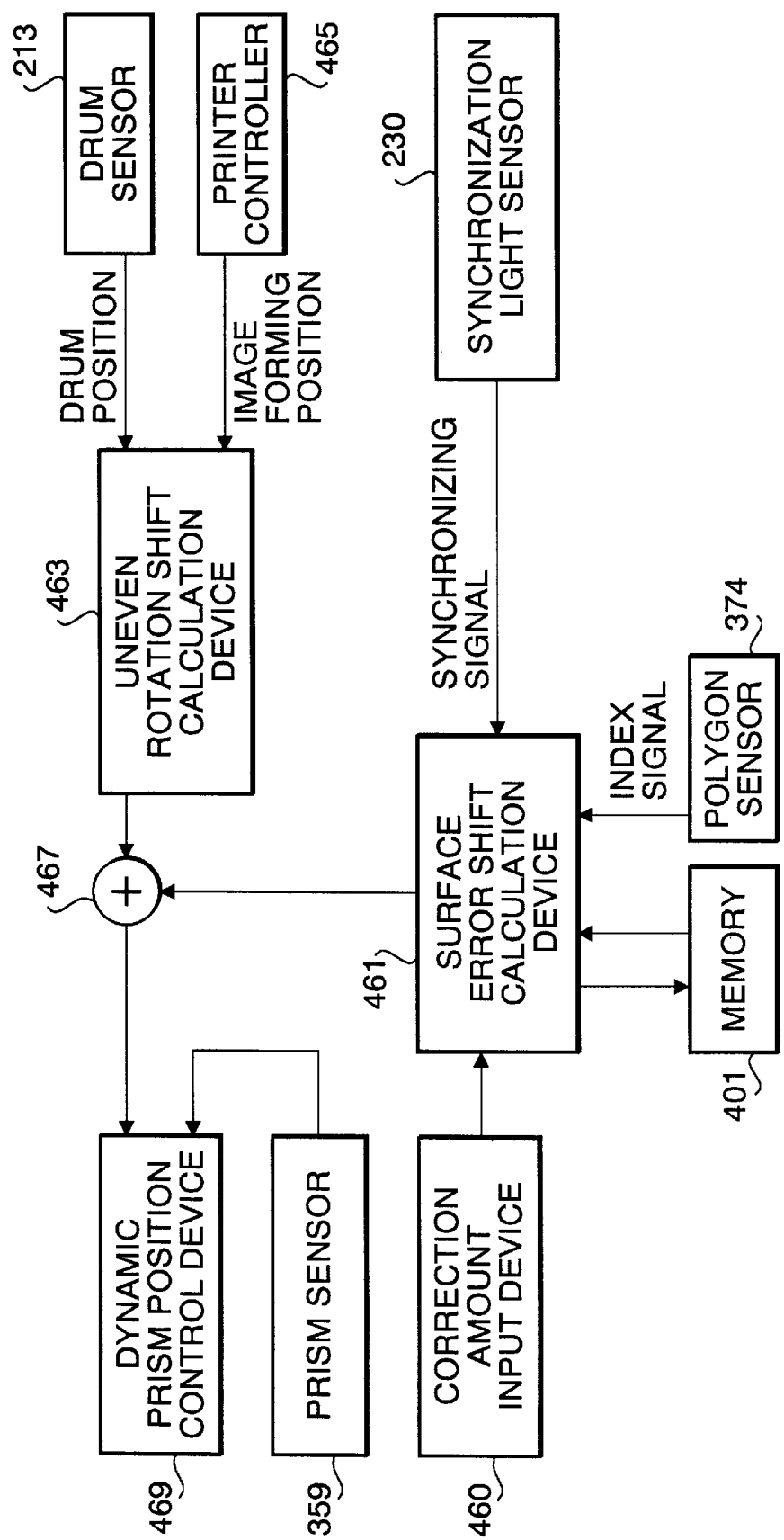
FIG. 5 is a block diagram which shows a part of a control system of the scanning optical device.

FIG. 5 is a block diagram that shows several parts of a control system for the scanning optical device of the embodiment. Control system 400 controls the dynamic prism 160 to move the position of the beam spot on the photoconductive drum 210 in the auxiliary scanning direction in order to compensate for the shift of the beam spot due to both tilt errors of the reflecting surfaces of the polygon mirror 180, which occur periodically and for which the amounts are known in advance, and unevenness of rotation of the photoconductive drum 210, which occurs randomly during driving of the photoconductive drum 210.

A surface error shift calculation device 461 identifies which of the reflecting surfaces is currently used for scanning the laser flux, based on the index signal output from the polygon sensor 374 and on the synchronizing signal output from the synchronization light sensor 230, and then outputs the amount of the shift of the beam spot due to the tilt error of the particular reflecting surface that is read from a memory 401.

As described above, the polygon sensor 374 may include, for example, a light emitting diode, which projects light towards the polygon mirror 180, and a light receiving element, which receives light that is reflected by the polygon mirror 180. In the present embodiment, mark M is made with a black, oil-based ink that makes the reflectivity of the marked part lower than the other parts, such that the output of the light receiving element drops temporarily each time the mark M passes below the polygon sensor 374. The polygon sensor 374 outputs an index signal at the time the mark M passes below the polygon sensor 374.

The surface error shift calculation device 461 identifies which reflecting surface of the polygonal mirror is currently scanning the laser flux on the basis of the index signals from the polygon sensor 374 and horizontal synchronization pulses (HS), generated for each scan, by detecting a signal output from the synchronization light sensor 230. In this case, because a single mark M is made on the polygon mirror 180, first a reflecting surface that corresponds to the mark M is identified by detecting the mark M. Thereafter, reflecting surfaces are identified by cyclically counting the number of horizontal synchronization pulses received between each detection of the mark M.

Alternatively, the central control circuit 400 could also identify the reflecting surface that is currently deflecting the light beam by dividing the time interval between index signals by the number of reflecting surfaces.

The amount of shift of a beam spot on the photoconductive drum 210 based on the tilt error of each reflecting surface of the polygon mirror 180 can be determined by calculation after either independently measuring the tilt angle of each reflecting surface or actually measuring the differences among the respective reflecting surfaces for a beam spot at a predetermined point on the photoconductive drum 210 or an optically equivalent surface. The correction data that have been determined are input into the memory 401 through the surface error shift calculation device 461 using a correction amount input device 460. Since the correction amount input device 460 is only needed during adjustment, the correction amount input device 460 can be removed after the correction data have been input into the memory 401.

Conversely, since unevenness in the rotation of the photoconductive drum 210 is not a periodic error, but rather is generated at random, an uneven rotation shift calculation device 463 calculates the shifting of the beam spots (generated from the rotation unevenness) based on the output of the drum sensor 213 and a printer controller 465. The compensation of the deviation of the beam spot due to the unevenness of the rotation of the photoconductive drum 210 s effective when the average rotation speed is constant. That is, if the rotation speed is lower than a reference speed during a predetermined period, it must be higher than the reference speed during another period. The requirement of average rotation speed is necessary because the adjustable range of the dynamic prism is limited to a predetermined amount, and, if the deviation amount accumulated, there would be some point at which the deviation could not be compensated by the adjustment by the dynamic prism 160.

Since the relationship between the adjusting angle of the dynamic prism 160 and the movement of the beam spot is non-linear, it is impossible to independently calculate a first adjusting angle to correct the shift due to the surface error, and another adjusting angle to correct the shift due to a rotational unevenness. Therefore, an adding circuit 467 synthesizes an amount of beam spot shifting by adding the amount of shifting of the beam spot due to tilt errors on the corresponding reflection surface to the amount of shifting of the beam spot due to the rotation unevenness. The adding circuit 467 outputs the adjusting angle of the dynamic prism 160 to counterbalance the synthesized amount of shifting of the beam spot, and the dynamic prism control device 469 controls the dynamic prism 160 to rotate to counterbalance (compensate for) the synthesized amount of shifting. The rotation angle of the dynamic prism 160 is detected by prism sensor 359 to provide feed-back for a closed-loop control by the dynamic prism control device 469. The prism sensor 359 includes, for example, a light emitting element (not shown) that directs a detection beam toward a mirrored portion (not shown) formed on the dynamic prism 160, and a light receiving element (not shown) that detects the position of the detection beam reflected from the mirrored portion.

Thus, even though the position of the scanning lines in the auxiliary scanning direction cannot be completely corrected by a combination of the cylindrical lens 170 and the fθ lens 190, and even if a rotational unevenness of the photoconductive drum 210 occurs, with the above control it is possible to accurately control the position of the scanning lines in the auxiliary scanning direction. The above correction is available even in the case where the linear image formed by the cylindrical lens 170 is formed apart from the reflecting surface of the polygon mirror 180 in order to avoid the influence of flaws or dust on the reflecting surface of the polygon mirror 180.

The dynamic prism 160 is rotated by the dynamic prism control device 469 between the end of a previous scan and the start of the image forming process. In order to secure this time for rotation control, the scan efficiency, in other words, the proportion of the image forming time with respect to the switching interval of the reflecting surfaces, is set to an appropriate value.

The present disclosure relates to subject matter contained in Japanese Patent Application Nos. HEI 8-037266, filed on Jan. 31, 1996, and HEI 08-040606, filed on Feb. 2, 1996, which are expressly incorporated herein by reference in their entirety.

What is claimed is:

1. A scanning optical device, comprising:
   a light source;
   a polygon mirror having a plurality of reflecting surfaces that deflect a light flux emitted from said light source to form a scanning beam spot on a photoconductive drum;
   an identifying device that identifies which of said reflecting surfaces is currently scanning said light flux;
   a memory that stores data corresponding to shape errors of said reflecting surfaces;
   a correcting member that corrects a position of said beam spot; and
   a controller that controls said correcting member in accordance with an output of said identifying device and with data read from said memory, so as to compensate for a deviation of said beam spot due to tilt errors of said plurality of reflecting surfaces of said polygon mirror and an unevenness of a rotation of said photoconductive drum, wherein said correcting member comprises a dynamic prism disposed between said light source and said polygon mirror, and a driving mechanism that rotates said dynamic prism to change an angle of said dynamic prism.

2. The scanning optical device according to claim 1, wherein said correcting member corrects said position of said beam spot in an auxiliary scanning direction.

3. The scanning optical device according to claim 1, wherein said memory stores said data as a deviation of said beam spot from a reference position.

4. The scanning optical device according to claim 1, wherein said identifying device comprises an index signal generator that generates an index signal at least once per rotation of said polygonal mirror.

5. The scanning optical device according to claim 4, wherein said index signal generator comprises an optical sensor that detects a mark on said polygon mirror at an eccentric portion from a rotational axis of said polygon mirror.

6. The scanning optical device according to claim 1, further comprising a scanning lens that converges said light flux deflected by said polygon mirror.

7. A scanning optical device, comprising:
   a light source;
   a polygon mirror having a plurality of reflecting surfaces that deflect a light flux emitted from said light source to form a scanning beam spot on an image surface;

an identifying device that identifies which of said reflecting surfaces is currently scanning said light flux;

a memory that stores data corresponding to shape errors of said reflecting surfaces;

a correcting member that corrects a position of said beam spot; and a controller that controls said correcting member in accordance with an output of said identifying device and with data read from said memory, wherein said identifying device further comprises a synchronization light sensor that generates a horizontal synchronization pulse for each scan.

8. The scanning optical device of claim 7, wherein said correcting member corrects said position of said beam spot in an auxiliary scanning direction.

9. A scanning optical device, comprising:

a light source;

a polygon mirror having a plurality of reflecting surfaces that deflect a light flux emitted from said light source to form a scanning beam spot on an image surface;

an identifying device that identifies which of said reflecting surfaces is currently scanning said light flux;

a memory that stores data corresponding to shape errors of said reflecting surfaces;

a correcting member that corrects a position of said beam spot; and a controller that controls said correcting member in accordance with an output of said identifying device and with data read from said memory, wherein said light source comprises a plurality of light emitting elements that are independently actuated to form a plurality of scanning lines per scan.

10. The scanning optical device of claim 9, wherein said correcting member corrects said position of said beam spot in an auxiliary scanning direction.

11. A scanning optical device, comprising:

a light source;

a polygon mirror that deflects a light beam emitted from said light source;

a scanning lens that converges a light beam deflected by said polygon mirror to form a beam spot on a photoconductive drum;

an index signal generator that generates an index signal at a predetermined rotational position at least once per rotation of said polygon mirror;

a memory that stores data of deviations of said beam spot in an auxiliary scanning direction due to tilting errors of reflecting surfaces of said polygon mirror;

a dynamic prism rotatably disposed between said light source and said polygon mirror;

a driving mechanism that rotates said dynamic prism to change a deviation angle of said dynamic prism; and a controller that controls said driving mechanism in order to compensate for a deviation of said beam spot due to a tilting error for each individual reflecting surface and an unstable rotation of said photoconductive drum, wherein said controller determines which reflecting surface of said polygonal mirror is used to deflect said light beam based on said index signal, said controller controlling said driving mechanism in accordance with said data of a currently used reflecting surface read from said memory.

12. The scanning optical device according to claim 11, wherein said dynamic prism is disposed in an afocal optical path.

13. The scanning optical device according to claim 11, wherein said index signal generator comprises an optical sensor that detects a mark attached to said polygon mirror at an eccentric portion from a rotational axis of said polygon mirror.

14. A scanning optical device, comprising:

a light source;

a polygon mirror that deflects a light beam emitted from said light source;

a scanning lens that converges a light beam deflected by said polygon mirror to form a beam spot on an image surface;

an index signal generator that generates an index signal at a predetermined rotational position at least once per rotation of said polygon mirror;

a memory that stores data of deviations of said beam spot in an auxiliary scanning direction due to tilting errors of reflecting surfaces of said polygon mirror;

a dynamic prism rotatably disposed between said light source and said polygon mirror;

a driving mechanism that rotates said dynamic prism to change a deviation angle of said dynamic prism; and a controller that controls said driving mechanism in order to compensate for a deviation of said beam spot due to a tilting error for each individual reflecting surface, wherein said controller determines which reflecting surface of said polygonal mirror is used to deflect said light beam based on said index signal, said controller controlling said driving mechanism in accordance with said data of a currently used reflecting surface read from said memory, said light source comprising a plurality of light emitting elements independently actuated to form a plurality of scanning lines per scan.

* * * * *